United States Patent [19]

Crane, Jr.

[11] 3,758,987

[45] Sept. 18, 1973

[54] AUTOMATIC PLANT WATERING DEVICE

[76] Inventor: William B. Crane, Jr., 340 E. 57th St., New York, N.Y. 10022

[22] Filed: July 5, 1972

[21] Appl. No.: 269,176

Related U.S. Application Data

[63] Continuation of Ser. No. 161,270, July 9, 1971, abandoned.

[52] U.S. Cl. ................................. 47/38.1, 220/13
[51] Int. Cl. ............................................ A01g 27/00
[58] Field of Search ...................... 47/1, 1.2, 38.1

[56] References Cited
UNITED STATES PATENTS

| | | | |
|---|---|---|---|
| 3,192,665 | 7/1965 | Cloud | 47/38.1 |
| 2,743,552 | 5/1956 | Hunter | 47/1 |
| 3,066,446 | 12/1962 | Buttinger | 47/38.1 |

Primary Examiner—Robert E. Pulfrey
Assistant Examiner—R. T. Rader
Attorney—James E. Olds et al.

[57] ABSTRACT

An automatic plant watering device responsive to the plant's need for water is disclosed. The new watering device includes a porous sensing element that is inserted into the soil and responds to the moisture content of the soil to control the supply of water from a substantially airtight enclosure. The porous element consititutes an air valve. When the soil is relatively dry, air flows through the porous element, and water is released from the enclosure to the soil. When the soil is wet, air cannot pass through the sensing element and the flow of water is automatically shut off. The invention is also directed, in part, to a novel sensing and control device for incorporation in an automatic plant watering device or system. The device uses a basically new principle of operation and has no moving parts.

2 Claims, 3 Drawing Figures

PATENTED SEP 18 1973 3,758,987
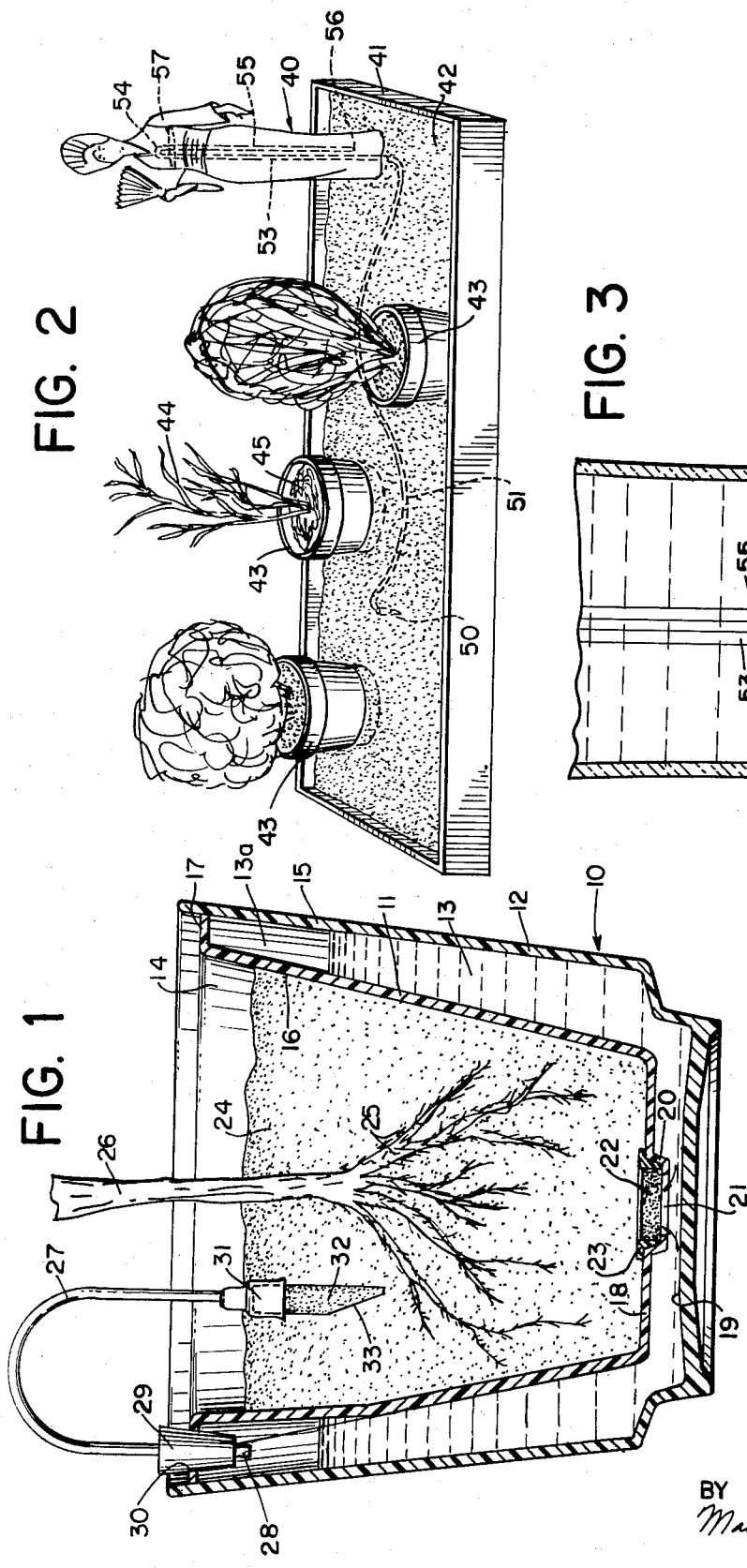
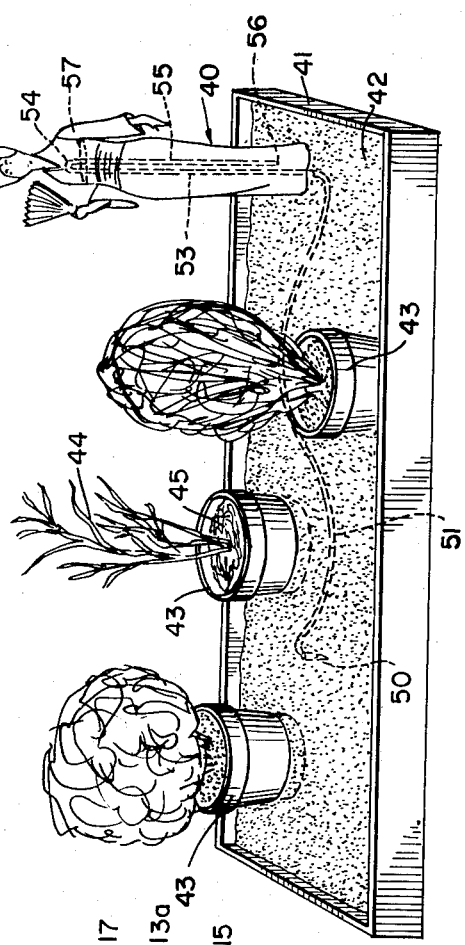
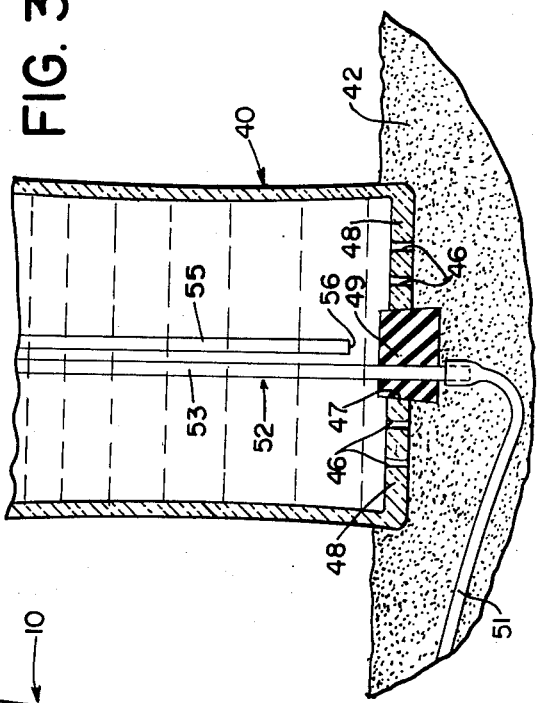
INVENTOR
WILLIAM B. CRANE, JR.
BY
Mandeville & Schweitzer
ATTORNEYS 3,758,987

AUTOMATIC PLANT WATERING DEVICE

BACKGROUND OF THE INVENTION

The present invention is a continuation of Ser. No. 161,278 filed July 9, 1971, now abandoned, and relates to the watering of plants. More specifically, the invention is concerned with a plant watering device that automatically provides the water needed by the plant for continued life and growth in response to the moisture content of the planting medium, i.e., soil.

It is well known that in order for plants to flourish they must be provided with the proper amount of moisture. By providing a plant with too little or too much water, its growth processes or life span will be impeded. Since the proper amount of moisture varies not only among different types of plants, but with the particular environment in which the plant is growing, it is a time consuming process to manually supply the necessary water. An automatic device for providing the necessary water to the plant is therefore a highly desirable and time saving device.

However, the variability and unpredictability of the amount of water needed by a specific plant provides the potential designer of an automatic watering device with a formidable obstacle. A satisfactory automatic watering device should provide water to the plant in response to the plant's need for the water and not as is characteristic of prior art devices, in response to an arbitrary standard, such as time. Time responsive watering devices have been generally found unsatisfactory since a plant's need for water is not solely a function of time, but varies with the condition of the planting medium, the atmospheric temperature, humidity,etc.

The new watering device of the invention is self-actuating and automatically provides a plant with the proper amount of moisture. The new and improved device accomplishes this objective by being responsive to the moisture content of the soil in which the plant is growing, which is a direct indication of the plant's need for water. The watering device of the invention, therefore, provides a plant it is servicing the proper amount of water without starving it at times or flooding it at times, as is characteristic of prior art devices that are actuated by means unrelated to the plant's actual need for moisture.

SUMMARY OF THE INVENTION

The automatic watering device of the invention including a porous sensing device that functions as an air valve and responds to the moisture condition of the soil to control a water supply. If the soil is too dry, water flows to the soil from the water supply until the proper moisture level (i.e., moisture content) is reached. When the proper mosture level is reached, the pores of the sensing device become closed to the flow of air and the flow of water is cut off by the reduction of pressure in a water reservoir.

In accordance with one aspect of the invention, a substantially airtight water supply reservoir is provided, having means for feeding water from the reservoir to a planting medium. The feeding means is activated by the relative pressures between these environments. Water flows into the planting medium when the total pressure on the reservoir side of the feeding means is greater than the pressure on the soil side. When a pressure balance is reached, the flow ceases until the pressure balance is again upset by an increase in pressure within the reservoir.

The external pressure acting on the feeding is substantially atmospheric pressure. The internal pressure, however, is almost constantly changing. The internal pressure is the sum of the air pressure above the water level and the head of water above the feeding means, and this varies as water flows out of the reservoir. The flow of water from the reservoir has a dual effect on the internal pressure by reducing the head of water above the feeding means and also increasing the volume of the air chamber above the water level available to contain a body of air.

During a water feeding cycle of the new automatic watering device, air is admitted under control to the air chamber of the reservoir, to accommodate expansion of the air space without reducing pressure. When sufficient water has been delivered, further inflow of air is discontinued automatically, and the air chamber pressure progressively decreases due to a reduction of water head and the accompanying expansion of the air chamber. When the sum of the air pressure above the water level and the net water head is reduced to the point where it equals the external pressure, the water flow into the planting medium stops.

In accordance with an important aspect of the invention, a novel sensing element is provided to determine and respond to the moisture condition of the planting medium. The sensing element communicates with the interior of the enclosure by way of a conduit, typically a section of flexible tubing extending from the sensing element into the interior of the enclosure.

The sensing element of the new watering device is characterized by permitting the flow of air from the atmosphere through the conduit and into the enclosure when the plant soil is relatively dry. Thus, in accordance with a specific aspect of the invention, the sensing element is inserted in the plant soil or other planting medium. The sensor responds to the moisture content of the planting medium by permitting air to pass into the enclosure when the planting medium is relatively dry. When the planting medium is in a relatively wet condition, i.e., when moisture comes in contact with the sensing element, the pores of the sensing element become blocked with the increasing availability of moisture from the soil. The air flow is thus stopped. The sensing element thus acts as a valve that is closed by the presence of adequate moisture and opened by the absence of adequate moisture.

The sensing element of the invention is a porous member, desirably of ceramic material, attached to and communicating with the end of the conduit outside the reservoir. To accomplish its basic objective, the pore size of the sensing element should be large enough to permit the seepage of air therethrough and small enough to prevent the flow of any significant quantity of water.

During operation of the new watering device, the only supply of air to the interior of the reservoir is through the sensing element and conduit. When the pores of the sensing element are blocked by water, i.e., when the planting medium is relatively moist, this supply of air is cut off. The air pressure above the water supply will then decrease as water briefly continues to flow out of the reservoir, since a fixed amount of air is occupying a continually increasing volume of the airtight chamber. Both components of the internal pressure, i.e., the net water head and the air pressure, are therefore decreasing simultaneously. Water will continue to flow from the reservoir until the decreasing internal pressure equals the external pressure, i.e., atmospheric pressure.

In order to resume the supply of water to the planting medium, it is necessary for the air pressure above the water level to be increased. In accordance with the invention, the pressure in the air chamber increases only as air is permitted to pass through the sensing element and into the enclosure through the conduit. Since the sensing element passes air only when not blocked by water, the air pressure component of the internal pressure increases only in response to a relatively dry condition in the planting medium. The increased pressure in the enclosure upsets the balance between the internal and external pressures, causing water to flow into the planting medium. When the planting medium becomes relatively wet again, the sensing element is again blocked by water and ceases to supply air of the chamber.

The invention provides a mechanically simple automatic watering control device that is truly carefree, has no moving parts, and requires only that the water supply be occasionally replenished. Gross variations in plant watering needs (as for swamp plants and desert plants, for example) can be readily accommodated by providing a selection of sensing elements corresponding to "wet," "medium," and "arid" plant environments. The operating concept of the invention is not a function of the particular configuration of the reservoir, permitting the new watering device to be manufactured in a wide variety of designs that appeal to the plant owner both functionally and aesthetically.

BRIEF DESCRIPTION OF THE DRAWING

FIG. 1 is a cross-sectional view of a plant watering device according to the invention.

FIG. 2 is a perspective view of a modified form of watering device according to the invention, arranged for servicing a plurality of plants.

FIG. 3 is a cross section of the lower portion of the water reservoir of the watering device of FIG. 2.

DESCRIPTION OF PREFERRED EMBODIMENTS

Referring now to the drawing, the embodiment of the invention shown in FIG. 1 constitutes, in effect, a jacketed receptable, which may be used either as a planter or as a receptacle for a pre-potted plant, as desired. The jacketed receptacle, generally designated by the reference numeral 10, comprises a pair of nested containers 11, 12, forming between them an airtight chamber or reservoir 13 and defining, in assembled form, a recess 14 for receiving a potted or unpotted plant.

In the FIG. 1 illustration, soil or other planting medium is received directly within the recess 14, so that the unit forms, in effect, a jacketed plant pot. It is also contemplated, however, that a previously potted plant may be inserted directly into the recess 14, and the configuration and portions of the recess are such that the plant pot of appropriate size may be supported by the bottom of the recess and concealed by its sides.

Although the size, shape and materials of construction of the jacketed receptable 10 are not, in themselves, features of the invention, it is desirable from the standpoint of convenience and economy of manufacture to form the containers 11, 12 of a suitable, molded plastic material. In one advantageous form of the invention, the containers 11, 12 may be formed of rigid polystyrene.

In the form of the invention shown in FIG. 1, the outer container 12 is a body of revolution, the side walls 15 of which diverge in the upward direction, at least in the upper regions. The inner container 11 also is a body of revolution having upwardly diverging side walls 16 and an outwardly extending flange 17 at its upper extremity. When the containers 11, 12 are assembled in nested relation, the annular flange 17 is arranged to seat tightly against the inner surface of the container wall 15. The flange 17 and the container wall 15 are joined in sealed relation, as by the use of suitable adhesives, solvents, heat bonding techniques, or the like, in order to provide an airtight seal.

The bottom wall 18 of the inner container lies above the bottom wall 19 of the outer container, providing a hollow bottom space forming part of the reservoir 13. A recess 20 is formed in the bottom wall of the inner container 11, and this recess is provided with a central opening 21. The opening 21 is covered over by means of a suitable, porous filter element 22, which is seated in the recess 20 by means of an annular gasket 23. As will more fully appear, a supply of water contained within the reservoir 13 may be caused to flow into the interior of the inner container 11 by passing through the filter element 22.

A desirable function of the filter element is to substantially limit the rate at which water may flow into the container recess 14 and thereby be directed into the soil or other planting medium 24, containing the root system 25 of a plant 26. This facilitates the operation of filing the water reservoir, when the reservoir necessarily is open to atmospheric pressure. It also desirably limits the maximum rate of water inflow during watering cycles. While the specific characteristics of the filter element 22 are not deemed critical, it has been found advantageous to utilize a wafer-like element of porous, ceramic material of, say, about 1 inch in diameter, and ⅛ inch in thickness, and having an average pore size on the order of 10 microns. This provides an arrangement which is both durable and reliable.

In accordance with the invention, when the watering device is in use, the enclosed reservoir chamber 13 is substantially filled with water and sealed. When the atmospheric pressure above the filter element 22, is less than the internal pressure below the element 22 water will seep through the filter element and into the plant soil 24. Once in the soil, the water will work its way by capillary action throughout the soil and into the root system 25 in the desired manner. Once the pores in the sensing element 32 become blocked with moisture from the soil the flow of the water through the filter element 22 will reduce the air pressure in the upper portion of the chamber 13 is progressively until the differential in air pressure inside and outside of the chamber balances the water head above the level of the filter element 22. Or stated another way, water will stop flowing through element 22 when the atmospheric pressure acting on the topside of element 22 equals the total pressure, of the water head and the partial vacuum within chamber 13a, acting on the underside of element 22. An equilibrium state is thus established, and no more water will flow into the plant soil 24 until air is admitted to the partially evacuated chamber 13a.

In accordance with one of the particularly important aspects of the invention, a novel, highly simplified, yet wholly effective arrangement is provided for controllably admitting air into the partially evacuated air chamber 13a whenever the condition of the plant soil 24 reflects a need for more moisture. For this purpose, there is provided an air tube 27, one end 28 of which communicates with the interior of the air chamber. Intermediate its ends, the air tube 27 passes through a stopper 29, which is either integral with or in sealed relation to the air tube. The stopper is formed of resilient material and is arranged to be received in sealing engagement with a filler opening 30 in the upper flange of the inner container 11.

At its outer end, the air tube 27 is provided with a cup-like socket 31, which is formed of elastic material and is either integral with or carried in sealed relation to the end of the air tube. The socket 31 receives one end of a porous sensing element 32, which, in accordance with the invention, constitutes a valve for controllably opening and closing the end of the air tube 27.

For a typical application, the sensing element 32 may be formed of a porous ceramic material, may have a generally cylindrical configuration of on the order of ⅜ of an inch in diameter and 2 inches in length (of which a ¼ to ½ inch may be received in the socket 31 and elastically gripped thereby). Desirably, although not necessarily, the free end of the sensing element is pointed or beveled, as at 33, so that the sensing element may be easily inserted in and completely buried by the planting soil 24.

In a relation as described, the material of the sensing element 32 desirably is a porous ceramic having an average pore size on the order of about 5 to about 12 microns. The arrangement is such that, when the porous ceramic sensing element is in a relatively dry condition, it will permit the controlled seepage of air into the air tube 27 and thereby into the partially evacuated chamber 13. However, when the sensing element is contacted by substantial moisture, the moisture is drawn into the sensing element by capillary action and functions, at least within the parameters of the present invention, to close off the pores of the element to the further flow of air and thereby prevent the further seepage of air into the air tube 27. For "arid" plant conditions, pore sizes toward the small end of the range are desirable, and for "wet" conditions, pore sizes toward the larger end of the range are more suitable.

Typically, the discharge end 28 of the air tube is disposed near the top of the airtight chamber 13, above the level of the water although in some cases it may extend downward below the water level toward the level of the bottom wall 18 of the inner container 11. In all events, however, the discharge end 28 should be disposed above the level of the water outlet into the container 11 as defined, in the present illustration, by the filter element 22 in the bottom wall 18.

In the operation of the device of FIG. 1, the chamber 13 is initially filled with water through the filler opening 30, the air tube 27 and plug 29 being first removed for this purpose. During the filling operation, the upper portion of the chamber 13 is opened to the atmosphere and there is, of course, a tendency for the water to flow into the plant soil 24, quite independently of any indicated need therefor. However, the rate of seepage through the filter element 22 is sufficiently low that very little water enters the plant soil during this initial period, and flooding of the plant roots is reliably avoided. When the chamber 13 is completely filled, the stopper 29 is replaced, establishing an airtight condition within the chamber 13, except for the single air opening provided by the air tube 27. The sensing element 32 may now be (in the case of a newly installed plant) or previously may have been (as where the chamber 13 is merely being refilled) inserted well into the plant soil 24, so as to be entirely covered thereby, and preferably so that the lower end of the resilient socket 31 is well below the level of the soil.

Assuming that the plant soil is initially moist, moisture will be extracted therefrom by capillary action into the pores of the sensing element 32, and the element 32 thereupon functions, in effect, as a closed valve to prevent the flow of air into the air tube 27. In this condition of the apparatus, a limited flow of water may occur through the pores of the filter element 22 until the upper extremity of the chamber 13 is sufficiently evacuated to balance the water head. This will establish an initial condition of stable equilibrium.

After the initial equilibrium is established, there is no further significant flow of water into the plant soil, and the soil will gradually tend to dry out through the normal transpiration processes of the plant as well as by evaporation from the surface of the soil. As the soil becomes relatively more dry, the pores of sensing element 32 begin to permit the slight seepage of air into the tube 27, partially relieving the evacuated condition within the upper portion of the chamber 13 and permitting the resumption of the water seepage into the lower portion of the container 11, through the filter element 22.

As previously mentioned, with the device of FIG. 1, the plant need not be potted directly into the inner container 11, but may be pre-potted, and the existing pot merely inserted into the container 11 and rested on the bottom wall 18. In such a case, the plant pot desirably is a standard clay pot, which has a desirable capillary action and will draw water upward into the plant soil as it seeps in through the outlet filter 22.

In the system of FIGS. 2 and 3, one or more plants are supplied with water from a receptacle 40, which may be in the nature of a figurine, statuette, or any other suitable container having an opening at the bottom but otherwise forming an airtight enclosure. For the system of FIGS. 2 and 3, there is provided a watertight receptacle 41, which may be of any appropriate size and configuration, but typically it is relatively large in area and relatively shallow. The receptacle 41 contains a body of water permeable medium 42, such as fine gravel, sand, or even plant soil. This water permeable medium 42 may constitute the planting medium itself, if desired, but more typically it serves as a matrix which receives the lower portions of one or more pots 43 containing plants 44 in a suitable potted planting medium 45.

In the arrangement shown in FIG. 2, the plant pots 43 are formed either of a porous material, such as conventional red clay pot material, or are otherwise arranged to have a substantial capillary association with the water permeable medium 42. Accordingly, watering of the plants themselves may be effected by saturating the permeable medium 42 with water, which is in turn drawn up into the plant soil 45 where it is consumed through the regular transpiration and evaporation processes.

In accordance with the invention, water is supplied to the permeable medium 42 through suitable small openings 46 in the bottom of the receptacle 40, the release of the water from the receptacle being controlled in accordance with the requirements of the plants 44, in the manner to be described. The only requirements of the receptacle 40 are that it be airtight, except for a filler opening 47 and one or more discharge openings 46 in its bottom wall 48. An enormous variety of conventionally available objects of art, such as statuettes, figurines, etc., are suitably constructed, or may be readily adapted for this purpose, so that the requirements of the receptacle 40 are adaptable to a wide variety of artistic desires of the user. Of course, where esthetic considerations are unimportant, an inverted jar or other container may be utilized.

In the system of FIGS. 2 and 3, the receptacle 40 is inverted and filled with water through the filler opening 47, after which the filler opening is closed by a resilient stopper 49, returned to its original orientation and positioned on or above the permeable medium 42. Because of the substantial pressure head of water over the outlet openings 46, a certain amount of water will flow through these openings into the permeable medium, until a partial vacuum is established in the upper extremities of the receptacle 40 and pressure equilibrium conditions are reached. Thereafter, no further water will be released from the receptacle except in relation to the admission of air into its interior.

Control of the admission of air into the receptacle 40 is effected by means of a sensing element 50, which may be of the same type and nature as the element 32 of the FIG. 1 device, and forms, in effect, a valve for controlling the seepage of air into an air tube 51. The air tube 51 is connected in sealed relation to one end of the sensing element 50 and extends to the base of the receptacle 40. The sensing element 50 is fully embedded in the permeable medium 42 (in the illustrated arrangement), so as to have moisture-sensing contact therewith. Desirably, the air tube 51 is also embedded in the permeable medium, although this is essentially for esthetic purposes and has no functional significance.

At the base of the receptacle 40, the air tube 51 is connected to a rigid tube section 52, which may be formed of plastic, glass or metal, for example, and forms, in effect, an extension of the air tube 51. The rigid tube section 52 has an upwardly directed leg 53 which is connected at its lower end to the air tube 51 and extends upward and within the receptacle 40 to a point above the maximum water level 57 to be accommodated.

In the system of FIGS. 2 and 3, the tube section 52 is bent sharply through a hairpin turn 54 and has a downwardly extending leg 55, the discharge end 56 of which is located a short distance above the outlet openings 46 to provide a normally constant net pressure head. By providing for the tube section 52 to extend above the maximum liquid level in the receptacle 40, a tendency for water to flow from the receptacle to the sensing element 50 is reduced. In many cases, however, it is advantageous to omit the high loop and have the tube section merely extend upward into the receptacle for a short distance, terminating at about the level of the discharge end 56, for example. The tube section may also enter from the side or top, as will be understood.

In the operation of the system of FIGS. 2 and 3, when the water permeable medium 42 is sufficiently dry to permit the seepage of air through the porous ceramic sensing element 50 and into the air tube 51, the air will enter the receptacle 40, partially relieving the partial vacuum in the upper extremity thereof and permitting water to flow gradually out through the outlet openings 46. As soon as the medium 42 becomes permeated with moisture, the moisture will be drawn by capillary action into the pores of the sensing element 50 and the air tube 51 will be closed off.

The rate of flow of water from the receptacle 40, after partial release of the partial vacuum therein, is somewhat a function of the size of the openings 46, and desirably these are relatively small. Moreover, if desired, a porous filter element, such as the ceramic wafer 22 of the FIG. 1 device, may be utilized in place of the discrete openings 46, depending upon the requirements of the system. In addition, the moisture level maintained in the soil is somewhat a function of the pore size of the sensing element 50. Typically, the average pore size of a sensing element of approximately ⅜ inch diameter and 2 inches in length may vary between about 5 and about 12 microns. For plant systems having minimum moisture requirements, it may be advantageous to use an element having an average pore size at the smaller end of this range, while an element having larger average pore sizes may be utilized where greater moisture requirements have to be met. For optimum operating conditions, the average pore size of the sensing element, and the water outlet arrangement of the receptacle should, of course, be able to accommodate a somewhat greater overall feeding rate than is actually required by the plants.

In the system illustrated in FIG. 2, the sensing element 50 is responsive to the moisture condition in the permeable medium 42. If desired, the sensing element 50 may be inserted in the plant soil 45 of any one of the pots 43, so as to be responsive to the water needs of that one plant. The monitored plant would then serve to control the supply of water to the other plants. Likewise, individual sensing units may be provided for each of the individual plant pots supported by the permeable medium 42. In this case, the air tube 51 would have, in effect, three valved inlets leading into it, and water would be released to the permeable medium 42 if any one or all of the bodies of plant soil 45 called for it.

As will be understood, in a system as illustrated in FIGS. 2 and 3, a plurality of plants will be watered in a similar manner, and so the various plants should have reasonably consistent watering requirements.

In either of the illustrated modifications of the invention, provision desirably is made for determining the condition of the water supply. For this purpose, the outer walls of the receptacle may be formed of a transparent or translucent material, or may be provided with unobtrusively located indicator portions of such material.

A basic concept of the present invention resides in the use of a porous sensing element as an air valve. The sensing element is embedded in the plant soil or other planting medium and responds to the moisture condition of the soil to permit or prevent the seepage of air into an air tube. Air is admitted to the tube in response to a relatively dry condition of the planting medium, and this serves to partially relieve a partial vacuum in a water reservoir and permits a controlled outflow of water from the reservoir and into the plant soil. The system operates without any moving parts whatever, and responds faithfully to the actual condition of the soil. Through a judicious selection of pore sizes for the sensing element, the optimum soil moisture level for a given plant may be maintained with substantial constancy over a long period of time, to provide ideal growing conditions for the plant. For typical needs, separate sensing elements may advantageously be provided to correspond to "dry," "medium" and "wet" environments.

The system of the invention is faithfully responsive to the actual needs of the plant in that, once the soil is properly moistened through the control of the sensing element, no more water will be added until there is a sufficient moisture loss through transpiration and evaporation processes. In the case of some plants, this may not occur for days, or conceivably weeks, while with other plants and under other atmospheric conditions, replenishment of the soil water supply may occur more than once a day. In all cases, the system normally is capable of tending the plant much more effectively than when the plant is personally attended to by even the most careful horticulturist. In this respect, it is an established fact that most household plants are either killed or severly damaged by improper watering, typically by watering in excess of the plant's needs, so that the root systems are flooded. When this occurs, the plant soil cannot supply air to the plant roots, and they will atrophy or die.

Being completely free of moving parts, the system of the invention is extremely reliable and maintenance-free in operation. Perhaps more important, its operation is simple, easily understood, and relatively foolproof, so that no special skills or training are required of the housewife or horticulturist to use the system with complete effectiveness.

A further advantageous feature of the invention resides in the virtually unlimited varieties of physical forms, arrangements, and materials of construction which may be utilized without compromising the functional aspects of the system. This enables a wide diversity of esthetic values to be accommodated, to provide a broad commercial appeal.

It should be understood, of course, that the embodiments of the invention herein illustrated and described are intended to be representative only, as certain changes may be made therein without departing from the clear teachings of the disclosure. Accordingly, reference should be made to the appended claims in determining the full scope of the invention.

I claim:

1. A plant watering system, responsive to the moisture condition of a particulate planting medium, and having particular utility for automatically reacting to the moisture condition within the planting medium to maintain a desired moisture condition within the planting medium for continued life and growth of a plant, said system including:

a porous moisture sensing device placed within and in contact with and near the upper root zone region of the planting medium, said device having a plurality of pores with an equivalent average pore size being smaller than about 12 microns, whereby said device acts as an air valve to restrict air movement from said medium through said porous device when the planting medium in contact therewith has reached a predetermined high moisture condition wherein the moisture within said planting medium has closed said pores, and to permit the passage of air from said medium through said porous device when the planting medium has reached a predetermined low moisture condition; and moisture supply means, including at least one discharge opening, separate from said sensing device and connected to said sensing device for reacting to the flow of air through said porous device and for providing moisture to said planting medium, said moisture supply means supplying moisture to the planting medium through said discharge opening.

2. A process of providing water to a particulate planting medium, comprising the steps of:

inserting a porous moisture sensing device within and in contact with the planting medium, said sensing device having a plurality of pores with an equivalent average pore size being smaller than about 12 microns, whereby said device acts as an air valve to restrict air movement from said medium through said porous device when the planting medium in contact therewith has reached a predetermined high moisture condition wherein the moisture within said planting medium has closed said pores, and to permit the passage of air from said medium through said porous device when the planting medium has reached a predetermined low moisture condition;

providing air-flow sensing means connected to said porous moisture sensing device; and providing moisture in a reservoir separate from said sending device which flows from said reservoir, to said planting medium during the time air is flowing through said porous device to said air-flow sensing means, said moisture flowing to the planting medium from said reservoir through a discharge opening.

* * * * *

UNITED STATES PATENT OFFICE

CERTIFICATE OF CORRECTION

Patent No. 3,758,987 Dated September 18, 1973

Inventor William B. Crane, Jr.

It is certified that error appears in the above-identified patent and that said Letters Patent are hereby corrected as shown below:

Column 1, Line 5, delete "now", and substitute therefor -- which was a continuation of Ser. No. 812,781 filed April 2, 1969, now both --.

Signed and sealed this 23rd day of April 1974.

(SEAL)
Attest:

EDWARD M. FLETCHER, JR.
Attesting Officer

C. MARSHALL DANN
Commissioner of Patents